E. T. Ligon,

Lock Nut.

No. 103,348.          Patented May 24, 1870.

United States Patent Office.

EDWIN T. LIGON, OF DEMOPOLIS, ALABAMA.

Letters Patent No. 103,348, dated May 24, 1870.

IMPROVEMENT IN LOCK-NUT.

The Schedule referred to in these Letters Patent and making part of the same.

*To all whom it may concern:*

Be it known that I, EDWIN T. LIGON, of Demopolis, in the county of Marengo and State of Alabama, have invented a new and improved Nut-Fastening; and I do hereby declare that the following is a full, clear, and exact description thereof, which will enable others skilled in the art to make and use the same, reference being had to the accompanying drawing forming part of this specification.

This invention relates to improvements in fastening nuts to bolts to prevent them from unscrewing, and consists in combining a ring, a pin, or a coating of soft solder with the nut and bolt, in any suitable way, when screwed together, for afterwards melting the solder by a hot wrench or other means, which, being removed, allows the solder to cool again, and permanently unite the parts.

Similar letters of reference indicate corresponding parts.

A is the nut;

B, the bolt; and

C, the pin of solder.

Figure 1:
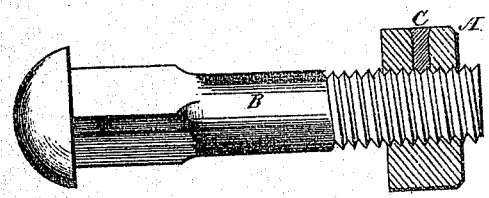
Figure 1 is a section of a nut applied to a bolt and provided with a pin of solder extending through the side of the nut, and resting against the side of the bolt.
Figure 2:
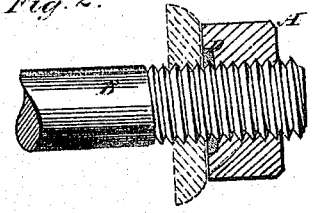
Figure 2 is another section of a nut applied to a bolt, and provided with a recess in the under side, in which is a ring of solder.

D, in fig. 2, represents a ring of solder.

This solder may be applied in any way found best. For example, the threads of the nut and the screw may be coated with it.

After the nut is screwed home I apply a hot wrench to melt the solder, and permanently solder the parts together, after the wrench is removed to allow the solder to cool.

Instead of using a wrench I may employ any other suitable means for heating the solder. For removing the nut I also apply a hot wrench to first melt the solder again.

Having thus described my invention,

I claim as new and desire to secure by Letters Patent—

The nut and bolt, secured together by means of a ring, pin, or other body of solder, so combined therewith as to unite the two, when heat is applied, by means of a hot wrench, or otherwise, after the parts are screwed together, substantially as specified.

EDWIN T. LIGON.

Witnesses:
THOS. J. FOSTER,
EUGENE MCCAA.